(12) United States Patent
Zhou

(10) Patent No.: US 12,512,752 B2
(45) Date of Patent: Dec. 30, 2025

(54) CHARGING MODULE, CHARGING DEVICE, AND CHARGING SYSTEM

(71) Applicant: Huawei Digital Power Technologies Co., Ltd., Shenzhen (CN)

(72) Inventor: Yuchen Zhou, Chengdu (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 196 days.

(21) Appl. No.: 18/489,268

(22) Filed: Oct. 18, 2023

(65) Prior Publication Data

US 2024/0136939 A1 Apr. 25, 2024
US 2024/0235416 A9 Jul. 11, 2024

(30) Foreign Application Priority Data

Oct. 20, 2022 (CN) .......................... 202211288016.8

(51) Int. Cl.
*H02M 1/42* (2007.01)
*H02J 7/02* (2016.01)
*H02M 7/487* (2007.01)

(52) U.S. Cl.
CPC ....... *H02M 1/4216* (2013.01); *H02M 1/4233* (2013.01); *H02M 7/487* (2013.01); *H02J 7/02* (2013.01)

(58) Field of Classification Search
CPC ............. H02M 1/4216; H02M 1/4233; H02M 1/4266; H02M 7/487; H02J 7/02
See application file for complete search history.

(56) References Cited

U.S. PATENT DOCUMENTS

2022/0224250 A1 7/2022 Koerner et al.
2023/0223860 A1* 7/2023 Everts ................. H02M 1/4225
363/125

FOREIGN PATENT DOCUMENTS

CN 213027811 U 4/2021

OTHER PUBLICATIONS

Hartmann et al., "Active Three-Phase Rectifier System Using a "Flying" Converter Cell", 2nd IEEE Energycon Conference & Exhibition / Advances in Energy Conversion Symp, Sep. 9, 2012, XP32466788A, 8 pages.

(Continued)

*Primary Examiner* — Jue Zhang
(74) *Attorney, Agent, or Firm* — Maier & Maier, PLLC

(57) ABSTRACT

A charging module and a charging device. The charging module includes a three-phase rectifier module, a bus capacitor module, an inductor, and a controller. An input end of the three-phase rectifier module is electrically connected to an input power supply, and an output end of the three-phase rectifier module is electrically connected to an input end of the bus capacitor module. The bus capacitor module includes a first bus capacitor and a second bus capacitor. The first bus capacitor is connected between a first output end of a three-phase bridge arm and a midpoint of the three-phase bridge arm, and the second bus capacitor is electrically connected between a second output end of the three-phase bridge arm and the midpoint. The inductor is electrically connected to the midpoint of the three-phase bridge arm and a midpoint between the first bus capacitor and the second bus capacitor.

17 Claims, 7 Drawing Sheets

(56) References Cited

OTHER PUBLICATIONS

Lee et al., "A Novel Carrier-Based PWM Method for Vienna Rectifier with a Variable Power Factor", IEEE Transactions on Industrial Electronics, IEEE, Jan. 2016, vol. 63, Issue 1, 10 pages.

Akssas et al., "Bidirectional On-Board Charger Based on the Efficient Topology Vienna Rectifier", 2022 2nd International Conference on Innovation Research in Applied Science, Engineering and Technology (IRASET), IEEE, XP034105856, Mar. 3, 2022, pp. 1-6.

Acharige et al., "Review of Electric Vehicle Charging Technologies, Configurations, and Architectures", IEEE Access, XP091331035, Sep. 30, 2022, vol. 11, pp. 1-36.

\* cited by examiner

CHARGING MODULE, CHARGING DEVICE, AND CHARGING SYSTEM

CROSS-REFERENCE TO RELATED APPLICATIONS

This application claims priority to Chinese Patent Application NO. 202211288016.8, filed on Oct. 20, 2022, which is hereby incorporated by reference in its entirety.

TECHNICAL FIELD

The embodiments relate to the field of electrical and electronic technologies, a charging module, a charging device, and a charging system.

BACKGROUND

Three-phase Vienna rectifier topology is widely used in a charging system scenario with unidirectional transmission of an active power. For example, an active load device and a reactive load device are included in a charging system. To ensure that the system has a unity power factor, an extra reactive apparatus usually needs to be disposed for compensation. Therefore, a reactive power regulation function may use the Vienna topology to reduce system costs.

In a conventional power factor correction solution: 1. A diode in the Vienna topology is replaced with any one of a metal-oxide-semiconductor field-effect transistor (MOSFET)/IGBT, a silicon carbide transistor, a gallium nitride transistor, and another power switch transistor. In this way, bidirectional power flow can be implemented, and a power factor correction function can be implemented. However, in this solution, costs are high. 2. Based on the Vienna topology, a compensation range is determined based on an angle of an input voltage, and a common-mode signal is generated and input into a modulating wave, to change a phase difference between a modulating voltage and the input voltage. However, it is complex to implement this solution, and a current waveform is distorted.

SUMMARY

In view of this, the embodiments may provide a charging module, a charging device, and a charging system, so that variable power factor performance of unidirectional power flow topology can be as good as that of bidirectional power flow topology. A current waveform and a bus ripple in a working condition with a non-unity power factor can be optimized, and costs can be reduced.

A first aspect provides a charging module, configured to supply power to a load. The charging module includes a three-phase rectifier module, a bus capacitor module, an inductor, and a controller. An input end of the three-phase rectifier module is electrically connected to an input power supply, where an output end of the three-phase rectifier module is electrically connected to an input end of the bus capacitor module, and the three-phase rectifier module includes a three-phase bridge arm. The bus capacitor module includes a first bus capacitor and a second bus capacitor, where the first bus capacitor is electrically connected between a first output end of the three-phase bridge arm and a midpoint of the three-phase bridge arm, and the second bus capacitor is electrically connected between a second output end of the three-phase bridge arm and the midpoint. The inductor is electrically connected to the midpoint of the three-phase bridge arm and a midpoint between the first bus capacitor and the second bus capacitor. The controller is configured to obtain an input voltage and an input current of the charging module and control a status of the three-phase rectifier module based on the input voltage and the input current.

An inductor is added between a bus midpoint and a three-phase rectifier module in Vienna topology. Because there is no sudden change in a current through an inductor, and the inductor may absorb a part of reactive power and isolate the rectifier module from a bus capacitor, not only a power factor correction function can be implemented, but also there is an effect of improving a bus ripple and a current waveform in a working condition with a non-unity power factor.

In an optional implementation, the three-phase rectifier module includes a first switch, a second switch, and a third switch. The first switch is electrically connected to a midpoint of a first-phase bridge arm and a first end of the inductor, a second end of the inductor is electrically connected to the midpoint between the first bus capacitor and the second bus capacitor, the second switch is electrically connected to a midpoint of a second-phase bridge arm and the first end of the inductor, and the third switch is electrically connected to a midpoint of a third-phase bridge arm and the first end of the inductor.

In an optional implementation, the controller is configured to: when it is detected that the input current is less than a current threshold, regulate a phase difference between the input current and the input voltage by controlling the first switch, the second switch, and the third switch.

In an optional implementation, the controller is further configured to: when the input power supply charges a reactive load device, regulate the phase difference between the input current and the input voltage by controlling the first switch, the second switch, and the third switch.

In an optional implementation, the charging module further includes a fourth switch, the fourth switch is connected in parallel to the inductor, and the fourth switch is further connected to the controller.

In an optional implementation, the controller is further configured to control the fourth switch to be on when the charging module needs to work with a unity power factor.

In an optional implementation, the controller is further configured to control the fourth switch to be off when the charging module needs to work with a non-unity power factor.

A second aspect further provides a charging device, configured to supply power to a load and including an input power supply and a charging module. The input power supply is configured to supply power to the charging module, and the charging module includes a three-phase rectifier module, a bus capacitor module, an inductor, and a controller. An input end of the three-phase rectifier module is electrically connected to an input power supply, where an output end of the three-phase rectifier module is electrically connected to an input end of the bus capacitor module, and the three-phase rectifier module includes a three-phase bridge arm. The bus capacitor module includes a first bus capacitor and a second bus capacitor, where the first bus capacitor is electrically connected between a first output end of the three-phase bridge arm and a midpoint of the three-phase bridge arm, and the second bus capacitor is electrically connected between a second output end of the three-phase bridge arm and the midpoint. The inductor is electrically connected to the midpoint of the three-phase bridge arm and a midpoint between the first bus capacitor and the second bus capacitor. The controller is configured to obtain an input voltage and an input current of the charging module and control a status of the three-phase rectifier module based on the input voltage and the input current.

An inductor is added between a bus midpoint and a three-phase rectifier module in Vienna topology. A power factor correction function can be implemented, and there is an effect of improving a bus ripple and an input current waveform in a working condition with a non-unity power factor.

In an optional implementation, the three-phase rectifier module includes a first switch, a second switch, and a third switch. The first switch is electrically connected to a midpoint of a first-phase bridge arm and a first end of the inductor, a second end of the inductor is electrically connected to the midpoint between the first bus capacitor and the second bus capacitor, the second switch is electrically connected to a midpoint of a second-phase bridge arm and the first end of the inductor, and the third switch is electrically connected to a midpoint of a third-phase bridge arm and the first end of the inductor.

In an optional implementation, the charging module further includes a fourth switch, the fourth switch is connected in parallel to the inductor, and the fourth switch is further connected to the controller and a hardware circuit, for example, a peripheral or driver related to the controller. The controller is further configured to: control the fourth switch to be on when the charging module needs to work with a unity power factor; and control the fourth switch to be off when the charging module needs to work with a non-unity power factor.

According to a third aspect, an embodiment further provides a charging system, including a charging device and one or more electric devices. The charging device is electrically connected to the one or more electric devices to charge the one or more electric devices. The charging device may include an input power supply and a charging module. The input power supply is configured to supply power to the charging module, and the charging module includes a three-phase rectifier module, a bus capacitor module, an inductor, and a controller. An input end of the three-phase rectifier module is electrically connected to an input power supply, where an output end of the three-phase rectifier module is electrically connected to an input end of the bus capacitor module, and the three-phase rectifier module includes a three-phase bridge arm. The bus capacitor module includes a first bus capacitor and a second bus capacitor, where the first bus capacitor is electrically connected between a first output end of the three-phase bridge arm and a midpoint of the three-phase bridge arm, and the second bus capacitor is electrically connected between a second output end of the three-phase bridge arm and the midpoint. The inductor is electrically connected to the midpoint of the three-phase bridge arm and a midpoint between the first bus capacitor and the second bus capacitor. The controller is configured to obtain an input voltage and an input current of the input power supply and control a status of the three-phase rectifier module based on the input voltage and the input current. In the charging system, an inductor may be added between a bus midpoint and a three-phase rectifier module in Vienna topology. Because there is no sudden change in a current through an inductor, and the inductor may absorb a part of reactive power and isolate the rectifier module from a bus capacitor, not only a power factor correction function can be implemented, but also there is an effect of improving a bus ripple and a current waveform in a working condition with a non-unity power factor.

In the embodiments, the inductor is disposed between the three-phase rectifier module and the midpoint of the bus capacitor module, so that the power factor correction function can be implemented, and there is an effect of improving a bus ripple and an input current waveform in a working condition with a non-unity power factor. In this way, variable power factor performance of unidirectional power flow topology can be as good as that of bidirectional power flow topology, thereby reducing hardware costs.

DETAILED DESCRIPTION OF THE EMBODIMENTS

It should be noted that, when an element is considered to be "connected to" another element, the element may be directly connected to the another element, or there may be an element disposed in between. When an element is considered to be "disposed" on another element, it may be directly disposed on the another element, or there may be an element disposed in between.

Unless otherwise defined, all terms have same meanings as those understood by a person skilled in the art. In the embodiments, the terms used in the description are merely intended to describe the embodiments but are not intended as limiting. The term "and/or" includes any and all combinations of one or more related listed items.

Figure 1:
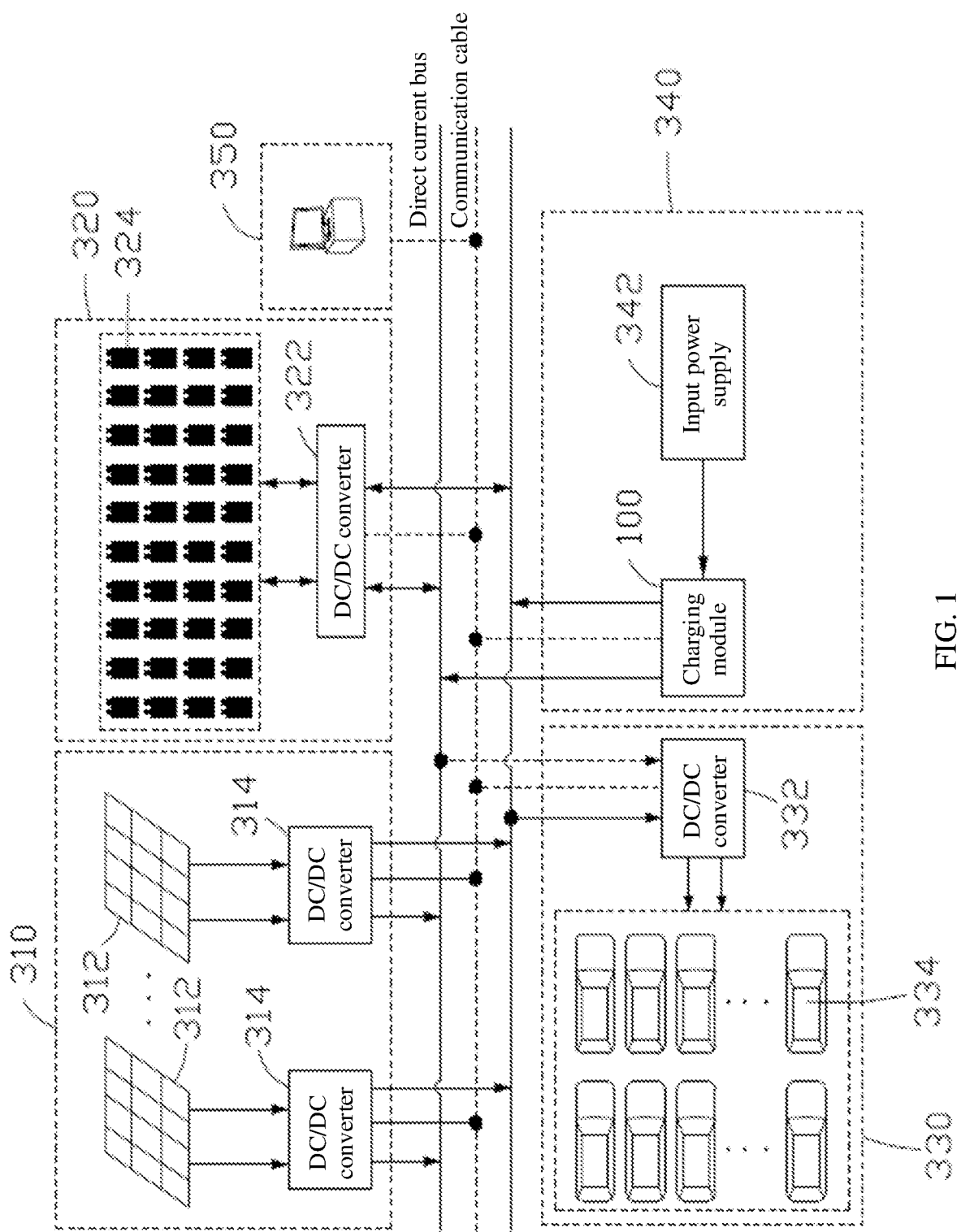
FIG. 1 is a schematic diagram of an environment of a charging module according to an embodiment.

FIG. 1 is a schematic diagram of an environment in which a charging module is used in an optical storage charging system according to an embodiment.

As shown in FIG. 1, the optical storage charging system may include a photovoltaic power generation system 310, an energy storage system 320, a charging station 330, a charging device 340, and a central control unit 350. The photovoltaic power generation system 310 may be connected to the energy storage system 320, the charging station 330, and the charging device 340 through a direct current bus. The photovoltaic power generation system 310, the energy storage system 320, the charging station 330, and the charging device 340 exchange information with the central control unit 350 through a communication cable or via a communication device. It can be understood that the central control unit 350 may be configured to monitor related information, for example, powers of an entire system and each component, and further configured to schedule each power unit.

It can be understood that the photovoltaic power generation system 310 may include a plurality of photovoltaic panel assemblies 312 and a plurality of DC/DC converters 314. The plurality of photovoltaic panel assemblies 312 may be connected to the plurality of DC/DC converters 314 in a one-to-one correspondence. It can be understood that the photovoltaic panel assemblies 312 may be power generation apparatuses that are exposed to sunlight and that generate a direct current. The photovoltaic panel assemblies 312 may transmit a generated direct voltage to the DC/DC converters 314, and the DC/DC converters 314 may convert the direct voltage from the photovoltaic panel assemblies 312. In this way, the DC/DC converters 314 may transmit the direct voltage on which direct current conversion is performed to the direct current bus of the system through a direct current bus.

The charging device 340 may include an input power supply 342 and a charging module 100. The input power supply 342 may be an alternating current power supply. For example, the input power supply 342 may output an alternating voltage to the charging module 100. The charging module 100 may be configured to convert the alternating voltage output by the input power supply 342 into a direct voltage. The charging module 100 may further transmit the direct voltage obtained through the conversion to the direct current bus, and a load may get energy from the direct current bus.

The energy storage system 320 may include a DC/DC converter 322 and a plurality of battery packs 324. The plurality of battery packs 324 are connected to the DC/DC converter 322. In a scenario, the DC/DC converter 322 may receive, through a direct current bus, energy output by the photovoltaic power generation system 310, to charge the plurality of battery packs 324. In another scenario, the DC/DC converter 322 may receive, through a direct current bus, energy output by the charging device 340, to charge the plurality of battery packs 324. In another scenario, the plurality of battery packs 324 may output a direct voltage to the DC/DC converter 322, and the DC/DC converter 322 may convert the direct voltage output by the plurality of battery packs 324, and output energy to charge the load through a direct current bus.

The charging station 330 may include a DC/DC converter 332. The DC/DC converter 332 may obtain energy and a power from the direct current bus, to supply power to a plurality of electric vehicles 334.

It can be understood that, in this embodiment, the charging device 340 and the photovoltaic power generation system 310 may output energy to the direct current bus. Therefore, a load device (for example, the charging station 330) may obtain energy through the direct current bus. The energy storage system 320 may output energy to the direct current bus, or the energy storage system 320 may obtain energy through the direct current bus. For example, during peak electricity hours, the energy storage system 320 may output energy to the direct current bus, and the load device may obtain, through the direct current bus, the energy output by the energy storage system 320, to supply power to the load device. During off-peak electricity hours, the energy storage system 320 may obtain energy through the direct current bus for storing energy. Therefore, the energy storage system 320 may be used for storing energy during off-peak electricity hours and supplying energy during peak electricity hours, so that the entire charging station system maximizes the use of new photovoltaic energy, and consumption of a power grid is reduced.

Figure 2:
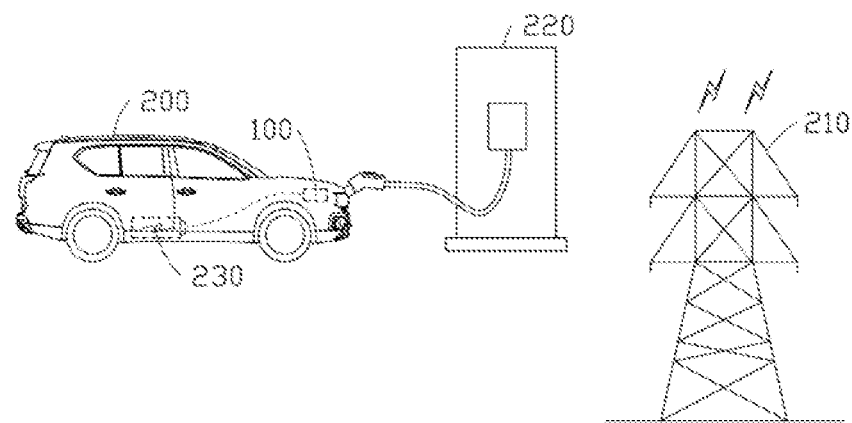
FIG. 2 is a schematic diagram of another environment of a charging module according to an embodiment.

FIG. 2 is a schematic diagram of another environment of a charging module 100 according to an embodiment.

In a scenario shown in FIG. 2, the charging module 100 may be configured to charge an electric vehicle 200 by using an external power supply. It should be noted that, in another embodiment, the charging module 100 is not limited to being used in the electric vehicle 200.

For example, the charging module 100 may be a vehicle-mounted charger in the electric vehicle 200. An alternating current power grid 210 may output alternating current electrical energy to an alternating current charging pile 220. The alternating current charging pile 220 may output alternating current electrical energy to the charging module 100. The charging module 100 may process or convert the received alternating current electrical energy and charge a battery 230 in the electric vehicle 200.

Figure 3:
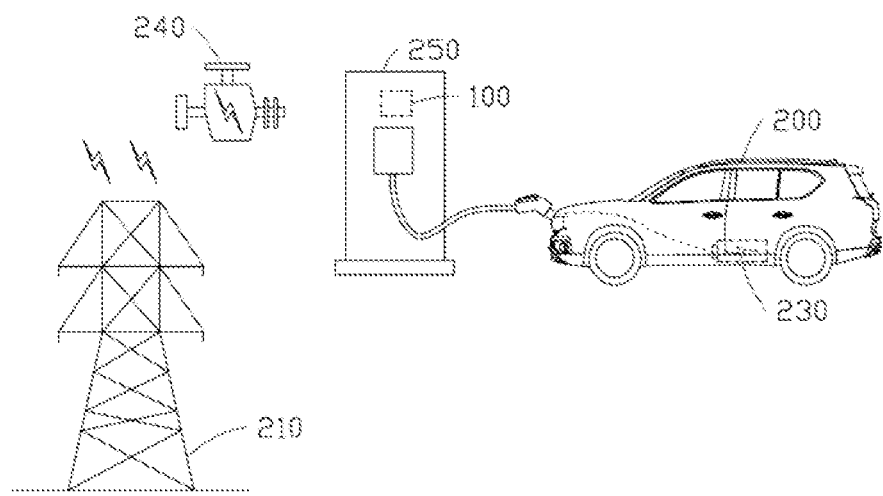
FIG. 3 is a schematic diagram of yet another environment of a charging module according to an embodiment.

FIG. 3 is a schematic diagram of another environment of a charging module 100 according to an embodiment.

In a scenario shown in FIG. 3, the charging module 100 may be used in a direct current charging pile 250. An alternating current power grid 210 may output alternating current electrical energy to a transformer 240. The transformer 240 performs conversion and outputs alternating current electrical energy to the direct current charging pile 250. The direct current charging pile 250 processes or converts the alternating current electrical energy and charges a battery 230 in an electric vehicle 200.

It can be understood that, in some possible scenarios, the charging module 100 may be used in a direct current charging pile, a vehicle-mounted charger, a high-power charging pile, an ultra-high-power charging pile, a portable charging pile, or the like.

An internal structure of the charging module is described below in detail.

Figure 4:
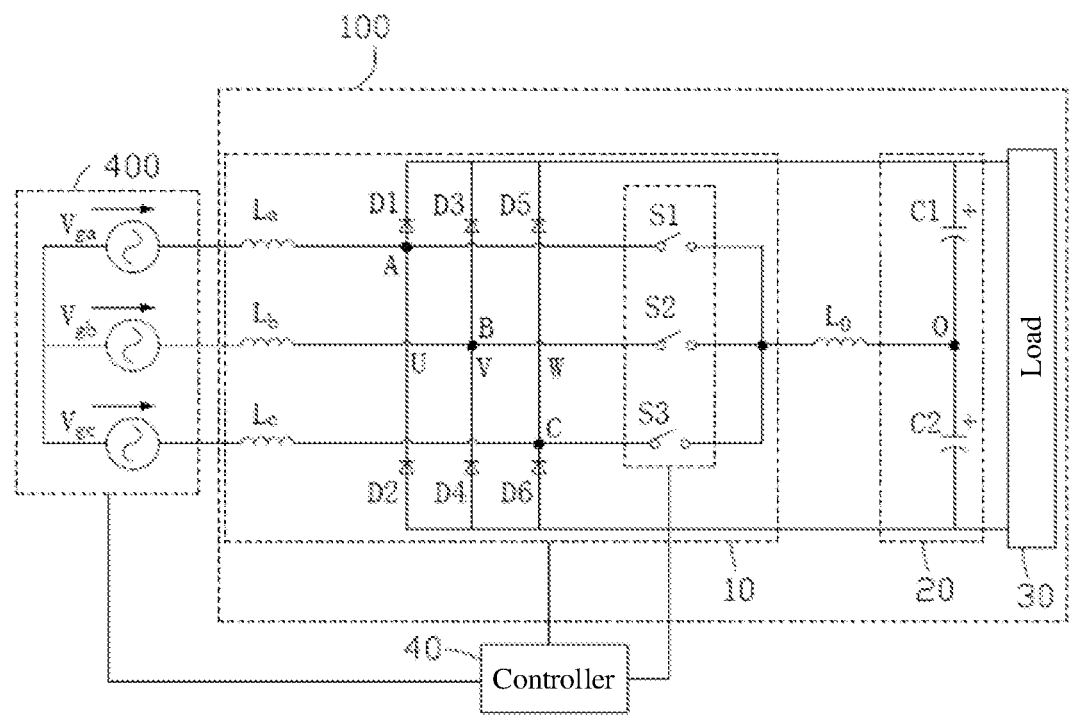
FIG. 4 is a schematic diagram of a structure of a charging module according to an embodiment.

FIG. 4 is a schematic diagram of a structure of a charging module 100 according to an embodiment.

In this embodiment, the charging module 100 may be electrically connected to an input power supply 400. In this embodiment, the input power supply 400 may be a three-phase alternating current power supply and may supply power to the charging module 100. The charging module 100 may include a three-phase rectifier module 10, a bus capacitor module 20, a controller 40, and an inductor $L_o$.

The bus capacitor module 20 may be electrically connected between the three-phase rectifier module 10 and a load device 30. The controller 40 may be connected to the three-phase rectifier module 10, and the controller 40 may control the charging module 100 to perform AC-DC processing by using the three-phase rectifier module 10 in Vienna topology, and correspondingly control a status of a switch in the three-phase rectifier module 10.

It can be understood that, in this embodiment, the three-phase rectifier module 10 may be configured to process an output voltage of the input power supply 400. For example, in a scenario, the three-phase rectifier module 10 may be configured to convert an alternating voltage output by the input power supply 400 into a direct voltage, and the direct voltage may be used for supplying power to the load device 30.

The three-phase rectifier module 10 may include a three-phase bridge arm connected in parallel, and the three-phase bridge arm may include a first-phase bridge arm U, a second-phase bridge arm V, and a third-phase bridge arm W.

The first-phase bridge arm U may include a first diode D1 and a second diode D2. The second-phase bridge arm V may include a third diode D3 and a fourth diode D4. The third-phase bridge arm W may include a fifth diode D5 and a sixth diode D6.

In this embodiment, an anode of the first diode D1 may be electrically connected to a cathode of the second diode D2, a cathode of the first diode D1 may be electrically connected to a cathode of the third diode D3 and a cathode of the fifth diode D5, and an anode of the second diode D2 may be electrically connected to an anode of the fourth diode D4 and an anode of the sixth diode D6. An anode of the third diode D3 may be electrically connected to a cathode of the fourth diode D4. An anode of the fifth diode D5 may be electrically connected to a cathode of the sixth diode D6. The cathode of the fifth diode D5 may be further electrically connected to the bus capacitor module 20, and the anode of the sixth diode D6 may be further electrically connected to the bus capacitor module 20.

It can be understood that the three-phase rectifier module 10 in this embodiment may further include a switch S1, a switch S2, and a switch S3.

A first end of the switch S1 may be connected to the controller 40, a second end of the switch S1 may be electrically connected to a midpoint A between the first diode D1 and the second diode D2, and a third end of the switch S1 may be electrically connected to a third end of the switch S2, a third end of the switch S3, and a first end of the inductor $L_o$. It can be understood that the first end of the switch S1 may be used as a control end of the switch S1, that is, the controller 40 may control a status of the switch S1. For example, the controller 40 may control the switch S1 to be on or off. Optionally, the controller 40 may be in a signal connection to the first end of the switch S1, or the controller 40 may be electrically connected to the first end of the switch S1.

A first end of the switch S2 may be connected to the controller 40, a second end of the switch S2 may be electrically connected to a midpoint B between the third diode D3 and the fourth diode D4, and a third end of the switch S2 may be electrically connected to the first end of the inductor $L_o$, the third end of the switch S1, and the third end of the switch S3. It can be understood that the first end of the switch S2 may be used as a control end of the switch S2. That is, the controller 40 may control a status of the switch S2. For example, the controller 40 may control the switch S2 to be on or off. Optionally, the controller 40 may be in a signal connection to the first end of the switch S2, or the controller 40 may be electrically connected to the first end of the switch S2.

A first end of the switch S3 may be connected to the controller 40, a second end of the switch S3 may be electrically connected to a midpoint C between the fifth diode D5 and the sixth diode D6, and the third end of the switch S3 may be electrically connected to the first end of the inductor $L_o$, the third end of the switch S1, and the third end of the switch S2. It can be understood that the first end of the switch S3 may be used as a control end of the switch S3. That is, the controller 40 may control a status of the switch S3. For example, the controller 40 may control the switch S3 to be on or off. Optionally, the controller 40 may be in a signal connection to the first end of the switch S3, or the controller 40 may be electrically connected to the first end of the switch S3.

It can be understood that, in some optional embodiments, the switches S1 to S3 may each be any one of a metal-oxide-semiconductor field-effect transistor (MOSFET) or an insulated gate bipolar transistor (IGBT), a silicon carbide transistor, a gallium nitride transistor, and another power switch transistor.

In this embodiment, the three-phase rectifier module 10 may further include a first inductor $L_a$, a second inductor $L_b$, and a third inductor $L_c$. A first end of the first inductor $L_a$ may be electrically connected to a first output end of the input power supply 400, and a second end of the first inductor L a may be electrically connected to the midpoint A. A first end of the second inductor $L_b$ may be electrically connected to a second output end of the input power supply 400, and a second end of the second inductor $L_b$ may be electrically connected to the midpoint B. A first end of the third inductor $L_c$ may be electrically connected to a third output end of the input power supply 400, and a second end of the third inductor $L_c$ may be electrically connected to the midpoint C.

The bus capacitor module 20 may include a first bus capacitor C1 and a second bus capacitor C2. A first end of the first bus capacitor C1 may be electrically connected to the cathode of the first diode D1, the cathode of the third diode D3, and the cathode of the fifth diode D5, a second end of the first bus capacitor C1 may be electrically connected to a first end of the second bus capacitor C2, and a second end of the second bus capacitor C2 may be electrically connected to the anode of the second diode D2, the anode of the fourth diode D4, and the anode of the sixth diode D6. A second end of the inductor $L_o$ may be electrically connected to a midpoint O between the first bus capacitor C1 and the second bus capacitor C2.

It can be understood that, in this embodiment, the first inductor $L_a$, the second inductor $L_b$, and the third inductor $L_c$ may be configured for energy storage and filtering during on and off of the switch S1, the switch S2, and the switch S3. The bus capacitor module 20 may be configured for energy storage and voltage stabilization of a direct current-side bus.

In the charging module 100, the inductor $L_o$ is added between the bus capacitor midpoint and the switches S1 to S3. The charging module may implement a power factor correction function and can further optimize a current waveform and a bus ripple in a working condition with a non-unity power factor. In this way, variable power factor performance of unidirectional power flow topology can be as good as that of bidirectional power flow topology, thereby reducing hardware costs.

It can be understood that the controller 40 in this embodiment may obtain an input voltage and an input current of the charging module. The controller 40 may be configured to control the statuses of the switches S1 to S3 in the charging module 100.

In an embodiment shown in FIG. 4, when a voltage of a power grid needs to be regulated, the charging module 100 may be used for regulating a reactive power of the power grid for reactive power compensation, to achieve reactive power voltage regulation.

In another scenario, when the charging module 100 is used in a working condition with a light load, a bus capacitor of the charging module 100 is large, and there is a large X-capacitor on an input side. As a result, in the working condition with the light load of the charging module, an input current leads an input voltage by an angle (for example, 1 degree to 5 degrees), and a value of a power factor of the charging module 100 in the working condition with the light load is low. In this scenario, the controller 40 may control the input current to lag the input voltage by using a phase-locked loop, to compensate for a phase difference between the input voltage and the input current caused by a capacitive reactive power, thereby increasing the value of the power factor of the charging module 100.

It can be understood that, because Vienna topology is unidirectional power flow topology, when there is a phase difference between an input voltage and an input current, a zero-crossing distortion of a current occurs. An inductor $L_o$ may be added between a bus midpoint and a switch in the Vienna topology. Because there is no sudden change in a current through the inductor $L_o$, when the current passes through zero, more current flows to an inter-phase switch, and less to the inductor $L_o$ at the midpoint and a diode. In this way, a waveform when the current passes through zero is optimized. The inductor $L_o$ may isolate a voltage at the bus midpoint from a voltage of the inductor, and the inductor may further absorb a part of reactive power. In this way, a bus voltage ripple can be further attenuated, and a bus ripple can be reduced.

An example of A-phase current zero crossing is used below for description. A B-phase current is a reverse current, and a C-phase current is a forward current.

Figure 5A:
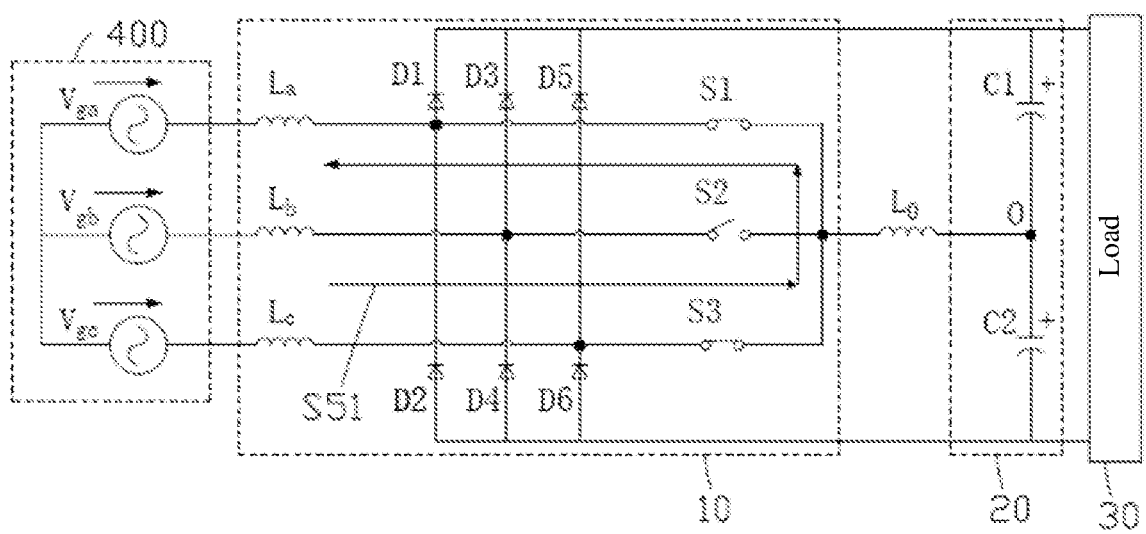
FIG. 5A to FIG. 5D are schematic diagrams of a charging module with A-phase zero crossing according.

As shown in FIG. 5A, the controller 40 may control the switch S1 and the switch S3 to be on and the switch S2 to be off. In this case, a current of the input power supply 400 may flow through an A-phase loop and a C-phase loop. A current path of the input power supply 400 is shown as a path S51 in FIG. 5A.

Figure 5B:
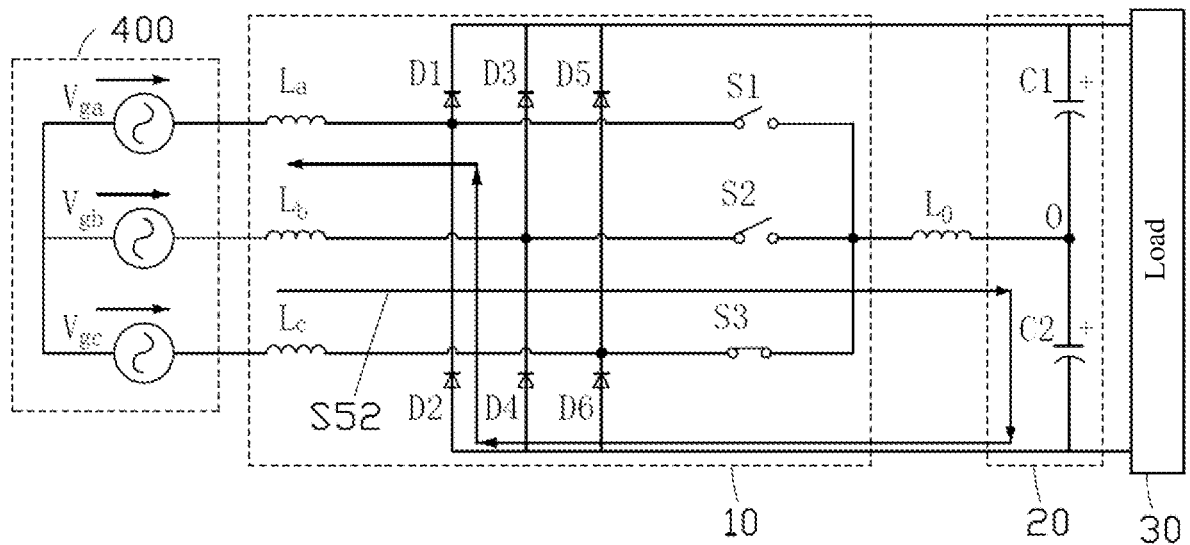

As shown in FIG. 5B, the controller 40 may control the switch S3 to be on and the switch S1 and the switch S2 to be off. In this case, the current of the input power supply 400 may flow through the inductor $L_o$ and the bus capacitor C2. The current path of the input power supply 400 is shown as a path S52 in FIG. 5B.

Figure 5C:
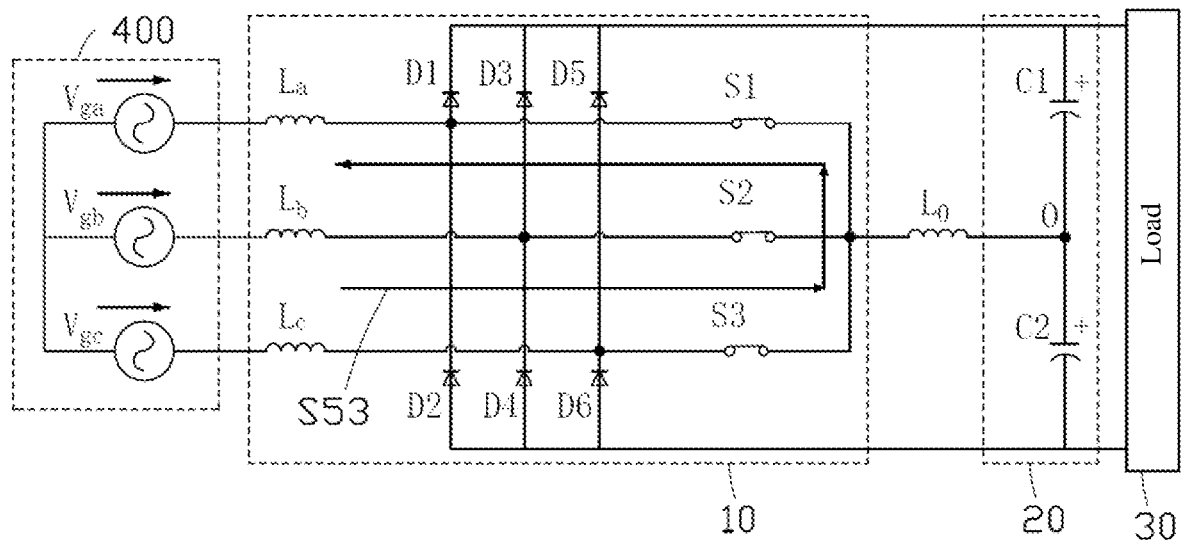

As shown in FIG. 5C, the controller 40 may control the switch S1, the switch S2, and the switch S3 to be on. In this case, the current of the input power supply 400 may flow through an A-phase loop, the B-phase loop, and the C-phase loop. The current path of the input power supply 400 is shown as a path S53 in FIG. 5C.

Figure 5D:
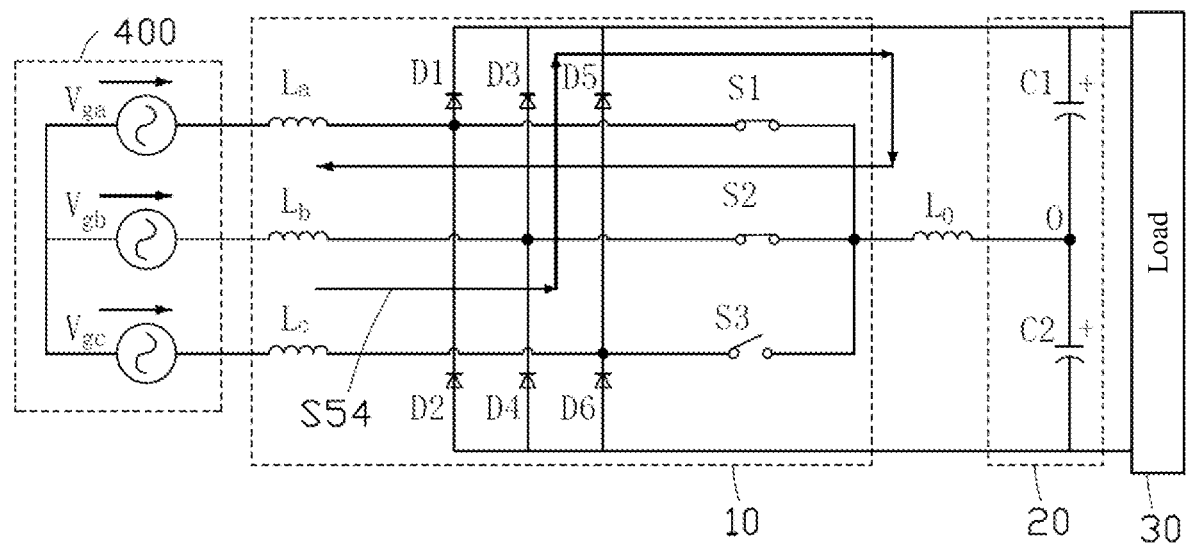

As shown in FIG. 5D, the controller 40 may control the switch S1 and the switch S2 to be on and the switch S3 to be off. In this case, the current of the input power supply 400 may flow through the inductor $L_o$, the bus capacitor C1, the A-phase loop, and the B-phase loop. The current path of the input power supply 400 is shown as a path S54 in FIG. 5D.

It can be seen from FIG. 5A to FIG. 5D that, when the current passes through zero, more current flows to an inter-phase switch, and less to the inductor $L_o$ at the midpoint and a diode. By using the charging module 100 shown in the embodiments of FIG. 5A to FIG. 5D, when the power factor is not 1 (that is, there is a phase difference between the input voltage and the input current), the inductor is added between the bus midpoint and the three-phase rectifier module in Vienna topology. Because there is no sudden change in a current through the inductor, and the inductor may absorb a part of reactive power and isolate the three-phase rectifier module from the bus capacitor, a power factor correction function can be implemented, and there is an effect of improving a bus ripple and a current waveform in a working condition with a non-unity power factor.

Figure 6:
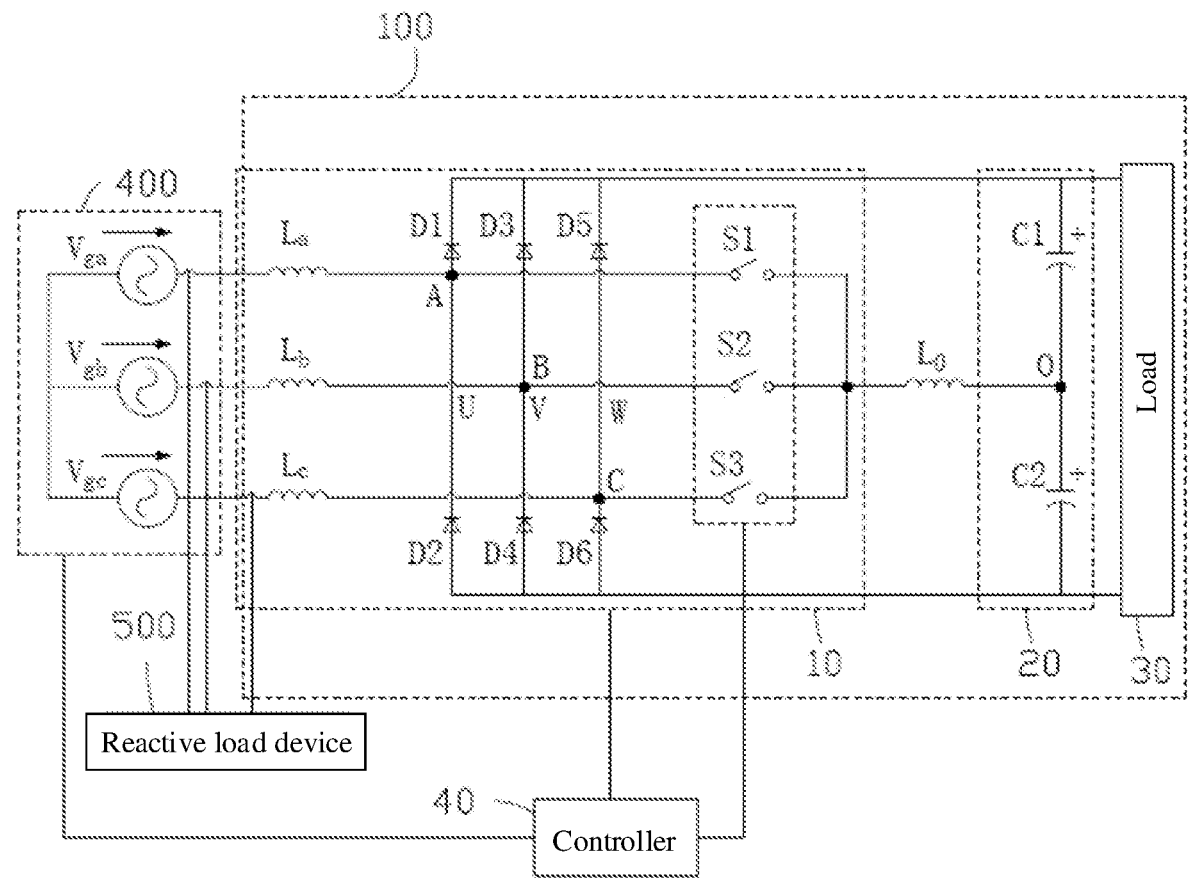
FIG. 6 is another schematic diagram of a structure of a charging module according to an embodiment.

FIG. 6 is a schematic diagram of a structure of a charging module 100 according to another embodiment.

A difference from the charging module 100 shown in the embodiment of FIG. 4 is that, in this embodiment, as shown in FIG. 6, a reactive load device 50 may be connected between the input power supply 400 and the three-phase rectifier module 10.

It can be understood that the charging module shown in FIG. 6 may be used in a scenario of an optical storage charging station. The reactive load device 50 may be a capacitive load device or an inductive load device. For example, the capacitive load device may be a battery, a computer, or the like. The inductive load device may be a transformer, a motor, or the like.

When the input power supply 400 charges the reactive load device 50 (for example, the capacitive load device or the inductive load device), one part of an input current flows through the reactive load device 50, and the other part of the input current flows through the charging module 100. In this scenario, the central control unit 350 monitors a value of a power factor of an entire system. To ensure that the entire system runs with a unity power factor, there is no phase difference between a sum of the two parts of the current and an output voltage, that is, all electricity obtained from the power grid is active power. In this case, the controller 40 may control the statuses of the switches S1 to S3 in the three-phase rectifier module 10 based on power factor instruction information delivered by the central control unit 350, to control the phase difference between the input voltage and the input current, so that the charging module works in a working condition with a non-unity power factor. In this way, the phase difference between the input voltage and the input current in the entire system due to a capacitive reactive power can be compensated, thereby increasing the value of the power factor of the entire system. In an optional implementation, the controller 40 may regulate a phase-locked loop for controlling, and translate a current reference signal, so that the input current lags the input voltage, thereby controlling an angle between the input voltage and the input current of the charging module. In this way, the charging module can run with a non-unity power factor, so that the charging module can absorb an inductive reactive power and emit a capacitive reactive power, thereby ensuring that the entire system runs with a unity power factor.

Figure 7:
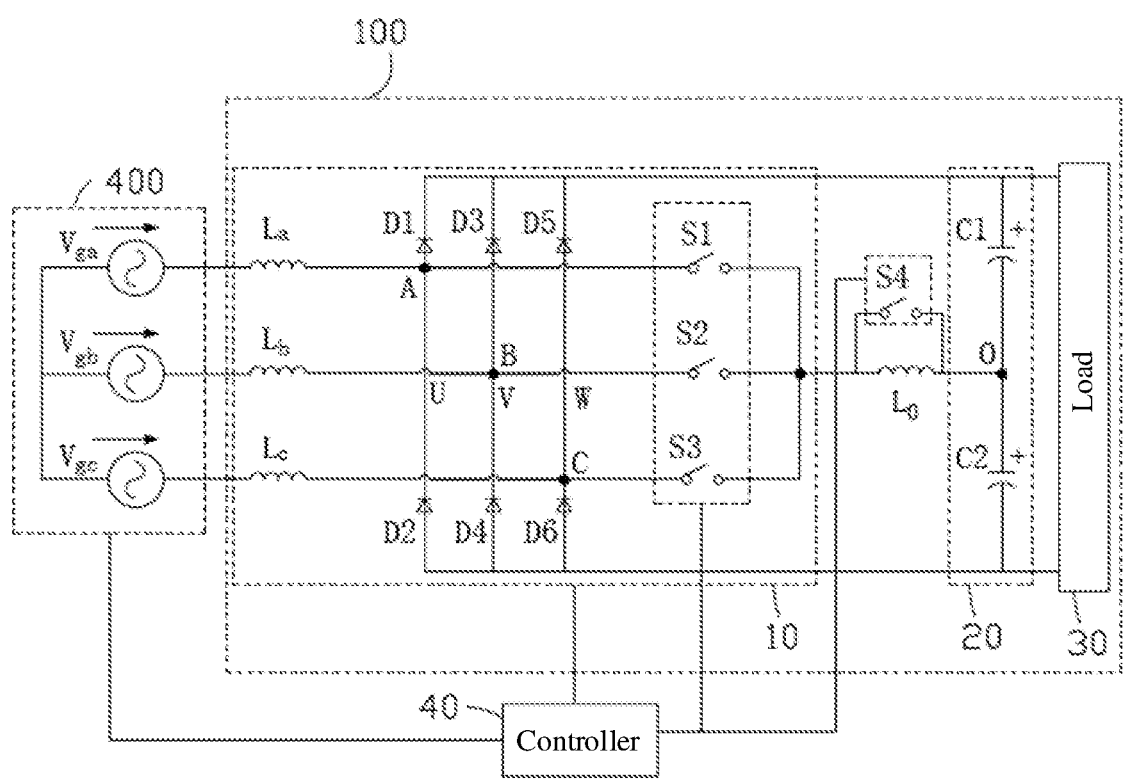
FIG. 7 is yet another schematic diagram of a structure of a charging module according to an embodiment.

FIG. 7 is a schematic diagram of a structure of a charging module 100 according to another embodiment.

A difference from the charging module 100 shown in the embodiment of FIG. 4 is that, in this embodiment, as shown in FIG. 7, the charging module 100 may further include a switch S4.

In this embodiment, the switch S4 is connected in parallel to the inductor $L_o$. A first end of the switch S4 may be connected to the controller 40, a second end of the switch S4 may be connected to the first end of the inductor $L_o$, the third end of the switch S1, the third end of the switch S2, and the third end of the switch S3, and the third end of the switch S4 may be connected to the second end of the inductor $L_o$ and the midpoint between the bus capacitor C1 and the bus capacitor C2.

It can be understood that the first end of the switch S4 may be used as a control end of the switch S4. That is, the controller 40 may control a status of the switch S4. For example, the controller 40 may control the switch S4 to be on or off. Optionally, the controller 40 may be in a signal connection to the first end of the switch S4, or the controller 40 may be electrically connected to the first end of the switch S4.

In an optional implementation, the switch S4 may be a relay. The switch S4 may alternatively be a MOS transistor or a switch component, for example, an IGBT, a SiC transistor, or a GaN transistor.

In a scenario, when the charging module 100 needs to work with a unity power factor, the controller 40 may output a control signal to the first end of the switch S4 to control the switch S4 to be on, so that the inductor $L_o$ can be in a short-circuit connection. In this case, the three-phase rectifier module 10 is in conventional Vienna topology, and power conversion from an alternating current to a direct current can be implemented efficiently, thereby improving system efficiency.

In another scenario, when the charging module 100 needs to work with a non-unity power factor, the controller 40 may output a control signal to the first end of the switch S4 to control the switch S4 to be off, so that the inductor $L_o$ may be connected between the midpoint O between the bus capacitor C1 and the bus capacitor C2 and the switches S1 to S3. In this case, a working principle of the charging module is the same as a working principle of the charging module in the embodiment of FIG. 4.

Based on the embodiment shown in FIG. 7, the switch S4 is added between the bus midpoint and the switches in Vienna topology. In this way, a status of the switch S4 can be controlled in different charging scenarios, so that charging scenario adaptability of the charging module is extended, and an indicator of the charging module in a normal working condition is not affected.

Figure 8:
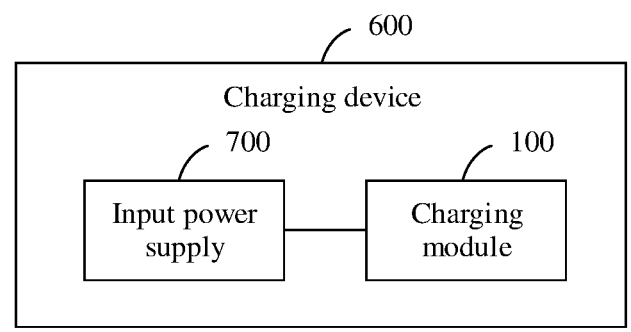
FIG. 8 is a schematic diagram of a structure of a charging device according to an embodiment.

It can be understood that, as shown in FIG. 8, an embodiment further provides a charging device 600. The charging device 600 may include the charging module 100 described in the foregoing embodiments and a power supply 700. The power supply 700 may supply power to the charging module 100. It can be understood that, in some embodiments, the power supply 700 may be the input power supply in the foregoing embodiments.

In some possible scenarios, the charging device 600 may be, but is not limited to, a direct current charging pile, a vehicle-mounted charger, a high-power charging pile, an ultra-high-power charging pile, a portable charging pile, or the like.

Figure 9:
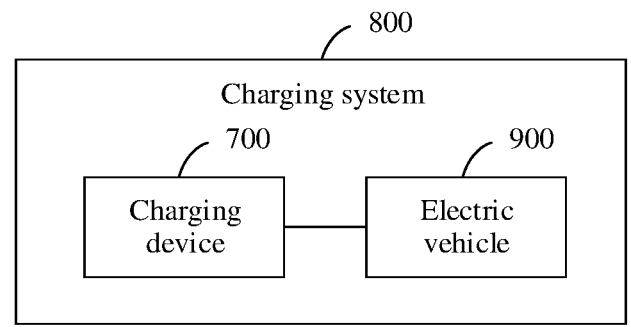
FIG. 9 is a schematic diagram of a structure of a charging system according to an embodiment.

As shown in FIG. 9, an embodiment further provides a charging system 800. The charging system 800 may include the charging device 600 described in the foregoing embodiment and an electric device 900.

It can be understood that the charging device 600 may be electrically connected to one or more electric devices 900. The charging device 600 may be configured to charge the one or more electric devices 900.

In some embodiments, the charging device 600 may be a charging pile. The electric device 900 may be an electric vehicle, an electric bicycle, an electric motorcycle, or the like. For example, in some scenarios, the charging device 600 is a direct current charging pile, and the electric device 900 is an electric vehicle. The direct current charging pile may be electrically connected to one electric vehicle and charge the electric vehicle. In another possible scenario, the direct current charging pile may be electrically connected to a plurality of electric vehicles and charge the plurality of electric vehicles simultaneously.

The foregoing descriptions are merely examples of implementations, but are not limitations. Although provided as examples of implementations as described above, the implementations are not intended to limit the embodiments and any person skilled in the art may make some changes or modifications to the content above as equivalent implementations of equivalent variations without departing from the scope of the embodiments.

What is claimed is:

1. A charging module configured to supply power to a load, the charging module comprising:
    a three-phase rectifier module,
    a bus capacitor module,
    an inductor, and
    a controller;
    an input end of the three-phase rectifier module is electrically connected to an input power supply, an output end of the three-phase rectifier module is electrically connected to an input end of the bus capacitor module, and the three-phase rectifier module comprises a three-phase bridge arm;
    the bus capacitor module comprises a first bus capacitor and a second bus capacitor, the first bus capacitor is electrically connected between a first output end of the three-phase bridge arm and a midpoint of the three-phase bridge arm, and the second bus capacitor is electrically connected between a second output end of the three-phase bridge arm and the midpoint;
    the inductor is electrically connected to the midpoint of the three-phase bridge arm and is directly electrically connected to a midpoint between the first bus capacitor and the second bus capacitor; and
    the controller is configured to:
    obtain an input voltage and an input current of the charging module, and
    control a status of the three-phase rectifier module based on the input voltage and the input current, to control a phase difference between the input voltage and the input current.

2. The charging module according to claim 1, wherein the three-phase rectifier module further comprises:
    a first switch electrically connected to a midpoint of a first-phase bridge arm and a first end of the inductor, a second end of the inductor is electrically connected to the midpoint between the first bus capacitor and the second bus capacitor;
    a second switch electrically connected to a midpoint of a second-phase bridge arm and the first end of the inductor; and
    a third switch electrically connected to a midpoint of a third-phase bridge arm and the first end of the inductor.

3. The charging module according to claim 2, wherein the controller is further configured to:
    when it is detected that the input current is less than a current threshold, control the phase difference between the input current and the input voltage by controlling the first switch, the second switch, and the third switch.

4. The charging module according to claim 2, wherein the controller is further configured to:
    when the input power supply charges a capacitive load device or an inductive load device, control the phase difference between the input current and the input voltage by controlling the first switch, the second switch, and the third switch.

5. The charging module according to claim 2, wherein the charging module further comprises a fourth switch, the fourth switch is connected in parallel to the inductor, and the fourth switch is further connected to the controller.

6. The charging module according to claim 5, wherein the controller is further configured to control the fourth switch to be on when the charging module needs to work with a unity power factor.

7. The charging module according to claim 6, wherein the controller is further configured to control the fourth switch to be off when the charging module needs to work with a non-unity power factor.

8. A charging device configured to supply power to a load, the charging device comprising:
    an input power supply; and
    a charging module, wherein the input power supply is configured to supply power to the charging module, and the charging module comprises a three-phase rectifier module, a bus capacitor module, an inductor, and a controller;

an input end of the three-phase rectifier module is electrically connected to the input power supply, an output end of the three-phase rectifier module is electrically connected to an input end of the bus capacitor module, and the three-phase rectifier module comprises a three-phase bridge arm;

the bus capacitor module comprises a first bus capacitor and a second bus capacitor, the first bus capacitor is electrically connected between a first output end of the three-phase bridge arm and a midpoint of the three-phase bridge arm, and the second bus capacitor is electrically connected between a second output end of the three-phase bridge arm and the midpoint;

the inductor is electrically connected to the midpoint of the three-phase bridge arm and is directly electrically connected to a midpoint between the first bus capacitor and the second bus capacitor; and the controller is configured to:

obtain an input voltage and an input current of the input power supply, and control a status of the three-phase rectifier module based on the input voltage and the input current.

9. The charging device according to claim 8, wherein the three-phase rectifier module further comprises:

a first switch electrically connected to a midpoint of a first-phase bridge arm and a first end of the inductor, a second end of the inductor is electrically connected to the midpoint between the first bus capacitor and the second bus capacitor;

a second switch electrically connected to a midpoint of a second-phase bridge arm and the first end of the inductor; and a third switch electrically connected to a midpoint of a third-phase bridge arm and the first end of the inductor.

10. The charging device according to claim 9, wherein the controller is further configured to: when it is detected that the input current is less than a current threshold, control the phase difference between the input current and the input voltage by controlling the first switch, the second switch, and the third switch.

11. The charging device according to claim 9, wherein the controller is further configured to:

when the input power supply charges a capacitive load device or an inductive load device, control the phase difference between the input current and the input voltage by controlling the first switch, the second switch, and the third switch.

12. The charging device according to claim 9, wherein the charging module further comprises a fourth switch, the fourth switch is connected in parallel to the inductor, and the fourth switch is further connected to the controller; and the controller is further configured to:

control the fourth switch to be on when the charging module needs to work with a unity power factor; and control the fourth switch to be off when the charging module needs to work with a non-unity power factor.

13. A charging system, comprising:

a charging device; and one or more electric devices, wherein the charging device is electrically connected to the one or more electric devices to charge the one or more electric devices, the charging device comprises an input power supply and a charging module, the input power supply is configured to supply power to the charging module, and the charging module comprises a three-phase rectifier module, a bus capacitor module, an inductor, and a controller;

an input end of the three-phase rectifier module is electrically connected to the input power supply, an output end of the three-phase rectifier module is electrically connected to an input end of the bus capacitor module, and the three-phase rectifier module comprises a three-phase bridge arm;

the bus capacitor module comprises a first bus capacitor and a second bus capacitor, the first bus capacitor is electrically connected between a first output end of the three-phase bridge arm and a midpoint of the three-phase bridge arm, and the second bus capacitor is electrically connected between a second output end of the three-phase bridge arm and the midpoint;

the inductor is electrically connected to the midpoint of the three-phase bridge arm and is directly electrically connected to a midpoint between the first bus capacitor and the second bus capacitor; and the controller is configured to:

obtain an input voltage and an input current of the input power supply, and control a status of the three-phase rectifier module based on the input voltage and the input current.

14. The charging system according to claim 13, wherein the three-phase rectifier module further comprises:

a first switch electrically connected to a midpoint of a first-phase bridge arm and a first end of the inductor, a second end of the inductor is electrically connected to the midpoint between the first bus capacitor and the second bus capacitor;

a second switch electrically connected to a midpoint of a second-phase bridge arm and the first end of the inductor; and a third switch electrically connected to a midpoint of a third-phase bridge arm and the first end of the inductor.

15. The charging system according to claim 14, wherein the controller is further configured to:

when it is detected that the input current is less than a current threshold, control the phase difference between the input current and the input voltage by controlling the first switch, the second switch, and the third switch.

16. The charging system according to claim 14, wherein the controller is further configured to:

when the input power supply charges a capacitive load device or an inductive load device, control the phase difference between the input current and the input voltage by controlling the first switch, the second switch, and the third switch.

17. The charging system according to claim 14, wherein the charging module further comprises a fourth switch, the fourth switch is connected in parallel to the inductor, and the fourth switch is further connected to the controller; and the controller is further configured to:

control the fourth switch to be on when the charging module needs to work with a unity power factor; and control the fourth switch to be off when the charging module needs to work with a non-unity power factor.

* * * * *